United States Patent
Hanada

[11] Patent Number: 6,124,021
[45] Date of Patent: Sep. 26, 2000

[54] BIAXIALLY ORIENTED LAMINATE FILM OF WHOLLY AROMATIC POLYAMIDE AND MAGNETIC RECORDING MEDIA

[75] Inventor: Makoto Hanada, Sagamihara, Japan

[73] Assignee: Teijin Limited, Osaka, Japan

[21] Appl. No.: 09/081,062

[22] Filed: May 19, 1998

[30] Foreign Application Priority Data

May 20, 1997 [JP] Japan .................................. 9-129545
May 21, 1997 [JP] Japan .................................. 9-131075

[51] Int. Cl.$^7$ ....................................................... G11B 5/66
[52] U.S. Cl. ......................... 428/141; 428/336; 428/402; 428/474.4; 428/694 ST; 428/694 SL; 428/694 SG; 428/900
[58] Field of Search ................... 428/474.4, 336, 428/402, 141, 694 ST, 694 SL, 694 SG, 900

[56] References Cited

U.S. PATENT DOCUMENTS

| | | | |
|---|---|---|---|
| 4,075,172 | 2/1978 | Ozawa et al. | 528/183 |
| 4,548,855 | 10/1985 | Ono et al. | 428/147 |
| 4,568,600 | 2/1986 | Ono et al. | 428/145 |
| 4,592,885 | 6/1986 | Ichino et al. | 264/173.16 |
| 5,069,962 | 12/1991 | Okazaki | 428/323 |
| 5,328,745 | 7/1994 | Kurihara et al. | 428/141 |

FOREIGN PATENT DOCUMENTS

| | | |
|---|---|---|
| 787579 A1 | 6/1997 | European Pat. Off. . |
| 52-39719 | 10/1977 | Japan . |
| 53-32838 | 9/1978 | Japan . |
| 54-147010 | 11/1979 | Japan . |
| 56-16937 | 2/1981 | Japan . |
| 58-68223 | 4/1983 | Japan . |
| 60-180837 | 9/1985 | Japan . |
| 60-180838 | 9/1985 | Japan . |
| 60-180839 | 9/1985 | Japan . |
| 1247162 | 10/1989 | Japan . |
| 2214657 | 8/1990 | Japan . |
| 373409 | 3/1991 | Japan . |
| 3114830 | 5/1991 | Japan . |
| 3119512 | 5/1991 | Japan . |
| 380410 | 12/1991 | Japan . |
| 434716 | 2/1992 | Japan . |
| 5194772 | 8/1993 | Japan . |
| 5210833 | 8/1993 | Japan . |
| 616836 | 1/1994 | Japan . |
| 780282 | 8/1995 | Japan . |
| 8203064 | 8/1996 | Japan . |
| 8230124 | 9/1996 | Japan . |

*Primary Examiner*—Leszek Kiliman
*Attorney, Agent, or Firm*—Sughrue, Mion, Zinn, Macpeak & Seas, PLLC

[57] ABSTRACT

A biaxially oriented laminate film comprising a wholly aromatic polyamide layer A and a wholly aromatic polyamide layer B containing an inert fine particles and laminated on one surface of the wholly aromatic polyamide layer A.

The surface not in contact with the wholly aromatic polyamide layer B of the wholly aromatic polyamide layer A has projections having an average height of 2 to 85 nm and an average width of 20 to 500 $\mu$m at a density of 4 to 2,500/mm$^2$ and the surface, not in contact with the wholly aromatic polyamide layer A, of the wholly aromatic polyamide layer B is rougher than the surface, not in contact with the wholly aromatic polyamide layer B, of the wholly aromatic polyamide layer A.

20 Claims, No Drawings

BIAXIALLY ORIENTED LAMINATE FILM OF WHOLLY AROMATIC POLYAMIDE AND MAGNETIC RECORDING MEDIA

DETAILED DESCRIPTION OF THE INVENTION

This invention relates to a biaxially oriented laminate wholly aromatic polyamide film and magnetic recording media comprising the same as a base film. More specifically, it relates to a biaxially oriented laminate wholly aromatic polyamide film which has excellent wind-up property, slipperiness and handling property, and is useful as a base film for a magnetic recording medium which is excellent in electromagnetic conversion characteristics, drop-out, running property and durability; and magnetic recording media comprising the same as a base film.

In recent years, remarkable progress has been made in high-density magnetic recording, as exemplified by the development and implementation of a thin ferromagnetic metal film magnetic recording medium in which a thin ferromagnetic metal film is formed on a non- magnetic base film by vacuum deposition or a physical deposition method such as sputtering or a plating method, and a thin layer coated magnetic recording medium in which a needle-like magnetic powder such as a metal powder or iron oxide powder is coated to a thickness of 2 $\mu$m or less.

Examples of the former include a Co-deposited tape (refer to JP-A 54-147010 (the term "JP-A" as used herein means an "unexamined published Japanese patent application")) and a vertical magnetic recording medium formed from a Co—Cr alloy (refer to JP-A 52-134706), whereas examples of the latter include an extremely thin layer coated medium for high-density magnetic recording (refer to "Technical Report MR 93-78" issued by the Institute of Electronics and Communication Engineers of Japan (1995-02)).

Since a coated magnetic recording medium of the prior art, i.e., a magnetic recording medium in which a mixture of magnetic powders and an organic polymer binder is coated on a non-magnetic base film is low in recording density and has a long recording wavelength, the thickness of its magnetic layer is as thick as about 2 $\mu$m or more. On the other hand, a thin metal film formed by thin film forming means such as vapor deposition, sputtering or ion plating has an extremely small thickness of 0.2 $\mu$m or less. In the case of the extremely thin-layer coated medium, too, a coated magnetic layer as thin as 0.13 $\mu$m has been proposed though it is provided with a non-magnetic underlying layer.

Therefore, in the above high-density magnetic recording medium, the surface condition of the non-magnetic base film has a great influence on the surface characteristics of the magnetic recording layer. Particularly in the case of a thin metal film magnetic recording medium, the surface condition of the non-magnetic base film appears directly as an uneven surface of a magnetic recording layer, thereby causing noise in recording and reproduction signals. Therefore, it is desirable that the surface of the non-magnetic base film be as smooth as possible.

On the other hand, from a view point of the formation of a non-magnetic base film and handling properties such as transportation, scratching, wind-up and unwinding in the film formation process, the film having too smooth film surface is not desirable because slipperiness between films deteriorates, a blocking phenomenon occurs, roll formation of the base film becomes inferior and consequently, the yield of products lowers, thereby inducing an increase in production costs. Therefore, from a view point of production costs, it is desirable that the surface of the non-magnetic base film be as rough as possible.

As described above, the surface of the non-magnetic base film is required to be smooth from a view point of electromagnetic conversion characteristics, whereas it is required to be rough from a view point of handling properties and film costs.

Further, in the case of a deposited thin metal film magnetic recording medium, the serious problem encountered when it is actually used is the insufficient running property of the surface of a thin metal film. In the case of a coated magnetic recording medium in which a magnetic powder is mixed into an organic polymer binder and the resulting mixture is coated on a base film, the running property of the magnetic surface can be improved by dispersing a lubricant in the binder. However, in the case of a thin metal film magnetic recording medium, such measure cannot be taken, and it is extremely difficult to maintain stable running property. The running property is inferior under high-temperature and high-humidity conditions in particular.

To supply an inexpensive high-quality base film for a high-density recording medium, therefore, it is necessary to satisfy the above two contradictory requirements at the same time.

As means for realizing this, there have been proposed (1) a method for forming a discontinuous film by coating a particular coating on the surface of a film (refer to JP-B 3-80410 (the term "JP-B" as used herein means an "examined Japanese patent publication"), JP-A 60-180839, JP-A 60-180838, JP-A 60-180837, JP-A 56-16937 and JP-A 58-68223), (2) a method for forming a continuous film having a fine uneven surface (refer to P-A 5-194772 and JP-A 5-210833), (3) a method for forming different front and back surfaces by such a technology as co-extrusion (refer to JP-A 2-214657 and JP-B 7-80282), and (4) a method which combines the above methods (1) and (3) or (2) and (3) (refer to JP-A 3-73409).

However, although the methods for forming an discontinuous film or a continuous film having a fine uneven surface can solve such problems as slipperiness between films and blocking, there still remain unsatisfactory in respect of base film formation and handling properties such as transportation, scratching, wind-up and unwinding in the film formation process. Thus, they have problems to be solved for their application to a base film for a high-density large-capacity magnetic recording medium from view points of the yield and costs of products. In addition, the co-extrusion technology of the prior art and a technology for combining a discontinuous film or a continuous film with the co-extrusion technology involve the same problems. Further, a thin metal film magnetic recording medium still has a problem with running property under high-temperature and high-humidity conditions.

Further, in the case of a thin metal film magnetic recording medium, it is extremely difficult to retain the running property of the surface of a thin metal film stably and the running property is poor particularly under such conditions as high temperature and high humidity, as described above. Further, in this case, a reduction in output at the time of repeated use is larger than that of a coated magnetic recording medium.

A further reduction in the thickness of a base film to be used for a magnetic recording medium has recently been demanded to improve the density of volume recording. The smaller the thickness of the base film is, the more remarkable the above problems become and the lower the stiffness of the base film becomes. As a result, there arise such new problems as deteriorations in the contact of the resulting magnetic recording medium with the magnetic head and in the electromagnetic conversion characteristics of the magnetic recording medium.

It is therefore, an object of the present invention to provide a biaxially oriented laminate wholly aromatic polyamide film which overcomes the defects of the prior art and is excellent in transportability, scratch resistance and wind-up property in the process of film formation.

It is another object of the present invention to provide inexpensive high-density magnetic recording media which exhibit the above excellent characteristics and are excellent in running property under high-temperature and high-humidity conditions when they are used as a thin metal film magnetic recording medium, for example.

The above and other objects and advantages of the present invention will become apparent from the following description.

According to the present invention, the above objects and advantages of the present invention are attained by a biaxially oriented laminate film comprising a wholly aromatic polyamide layer A and a wholly aromatic polyamide layer B formed on one surface of the wholly aromatic polyamide layer A, characterized in that the surface, not in contact with the wholly aromatic polyamide layer B, of the wholly aromatic polyamide layer A has projections having an average height of 2 to 85 nm and an average width of 20 to 500 μm at a density of 4 to 2,500/mm²; the wholly aromatic polyamide layer B contains inert fine particles B; and the surface, not in contact with the wholly aromatic polyamide layer A, of the wholly aromatic polyamide layer B is rougher than the surface, not in contact with the wholly aromatic polyamide layer B, of the wholly aromatic polyamide layer A.

The biaxially oriented laminate film of the present invention (may be referred to as "laminate film" or "wholly aromatic polyamide laminate film" hereinafter) comprises a wholly aromatic polyamide layer A (may be referred to as "resin layer A" hereinafter) and a wholly aromatic polyamide layer B (may be referred to as "resin layer B" hereinafter). The resin layer B is laminated on one surface of the resin layer A. The wholly aromatic polyamides forming the resin layer A and the resin layer B may be the same or different.

The wholly aromatic polyamide is preferably a polymer which contains at least 70 mol % of a recurring unit represented by the following formula (A):

—(HN—Ar$_1$—NHCO—Ar$_2$—CO)—  (A)

wherein Ar$_1$ is a residual aromatic group obtained by removing two —NH$_2$ groups from an aromatic diamine and Ar$_2$ is a residual aromatic group obtained by removing two —COOH groups from an aromatic dicarboxylic acid.

Preferred examples of the aromatic residue represented by Ar$_1$ and Ar$_2$ include:

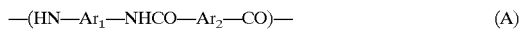

-continued

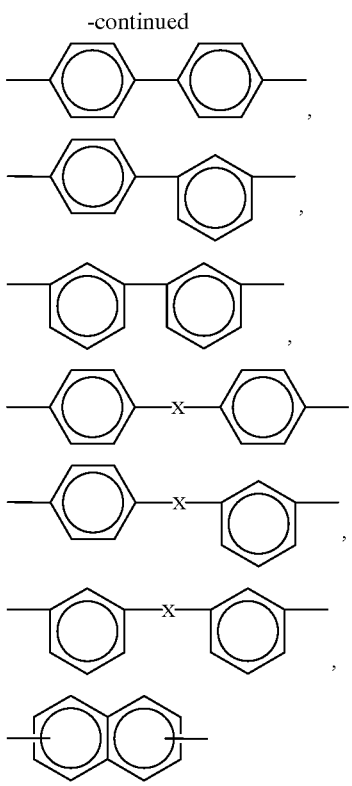

and those obtained by substituting some hydrogen atoms on the benzene ring of these groups by a halogen atom (chlorine in particular), a nitro group, an alkyl group having 1 to 3 carbon atoms (methyl group in particular) or an alkoxy group having 1 to 3 carbon atoms.

In the above formula, X is a divalent atom or group such as —O—, —CH$_2$—, —SO$_2$—, —S— and —CO—.

The wholly aromatic polyamide can contain at least one Ar$_1$ derived from an aromatic diamine and at least one Ar$_2$ derived from an aromatic dicarboxylic acid.

The aromatic diamine and the aromatic dicarboxylic acid having the above aromatic residue are known per se.

The wholly aromatic polyamide preferably contains at least two aromatic residues Ar$_1$ derived from an aromatic diamine, particularly preferably

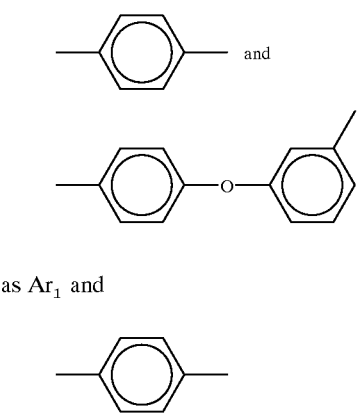

as Ar$_1$ and

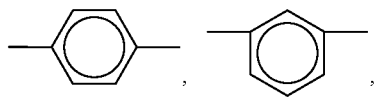

as Ar$_2$.

When the laminate film of the present invention is used as a base film for a thin magnetic tape, Ar$_1$ and Ar$_2$ are preferably a 1,4-substituted divalent aromatic group or its chlorine-substituted aromatic group as illustrated above to secure mechanical properties and dimensional stability against environmental changes with regard to temperature and humidity.

The wholly aromatic polyamide in the present invention preferably contains a recurring unit represented by the above formula (A) in an amount of at least 80 mol %, more preferably at least 90 mol %, based on the total of all the recurring units.

To produce the wholly aromatic polyamide, an interfacial polymerization, solution polymerization or the like can be employed. Of these, the solution polymerization is preferred. At least one member selected from the group consisting of dimethylformamide, dimethylacetoamide, N-methylpyrrolidone, N-methylcaprolactam, dimethyl sulfoxide, hexamethyl phosphor triamide, tetramethyl urea and 1,3-dimethyl-2-imidazolidinone can be used as a main component of the polymerization solvent. To improve the solubility of a polymer, an inorganic salt such as calcium chloride or lithium chloride may be added in a suitable amount before, after or during polymerization. An acid component and an amine component are reacted with each other in substantially equimolar amounts. Either one of these components may be used in an excessive amount for the purpose of controlling the degree of polymerization. Further, a small amount of a monofunctional acid component or amine component may be used as an end capping agent. To capture hydrogen chloride generated by the reaction, an aliphatic or aromatic amine or quaternary ammonium salt may be added to a polymerization system. After termination of the reaction, a basic inorganic compound such as lithium hydroxide, magnesium hydroxide, calcium hydroxide, lithium carbonate, magnesium carbonate, calcium carbonate, magnesium oxide, or calcium oxide is added as required to carry out a neutralization reaction.

Such a wholly aromatic polyamide production process is detailed, for example, in JP-B 52-39719 and JP-B 53-32838.

To provide excellent mechanical properties to the wholly aromatic polyamide film of the present invention, the polymer preferably has a logarithmic viscosity (determined by measuring, at 30° C. in concentrated sulfuric acid, the polymer obtained by introducing the polymer stock solution containing the aromatic polyamide after polymerization into a solvent such as alcohol or water, re-precipitating and separating) of 1.5 or more, more preferably 2 or more, before film formation.

The wholly aromatic polyamide obtained as described above can be obtained by introducing the above components into a solvent such as alcohol or water, re-precipitating and separating. The resulting wholly aromatic polyamide may be dissolved in a solvent again to be used for forming a film. Preferably, the solution obtained by a polymerization reaction can be used directly or by adjusting its concentration after polymerization. The adjustment of the concentration can be carried out by concentration or dilution with another solvent. Illustrative examples of the solvent are the same as those listed for the polymerization solvent.

Although inert fine particles must be existent in the resin layer B, and in the resin layer A as desired, the particles are added to the wholly aromatic polyamide as follows.

The above inert fine particles are dispersed in advance in an organic solvent having a viscosity of 10 poise or less, preferably 1 poise or less, or in a diluted low-viscosity polymer solution of the wholly aromatic polyamide. When the inert fine particles are directly added to a polymer solution for film formation, a great number of large agglomerates are formed undesirably. It is preferred to use a solvent for film formation, but another solvent may be used as long as it does not have an adverse effect on film formation. A small amount of a dispersion aid or water may also be contained in the dispersion of the inert fine particles. When there is a large amount of water in the dispersion, the dispersibility of the fine particles in the dispersion lowers.

To disperse the inert fine particles, the inert fine particles and other dispersion aid are added to the above solvent or the diluted polymer solution and dispersed by an agitation type dispersing machine, a ball mill, a sand mill, an ultrasonic dispersing machine or the like. Particularly, ultrasonic dispersion is preferred.

The inert fine particles dispersed in the low-viscosity solution are added to and mixed with the above polymer solution. They may be added to the solvent before polymerization, dispersed in the whole solvent used for polymerization or added during the preparation of the polymer solution. Further, they may be added or mixed right before casting at the time of film formation.

A stock solution for film formation prepared above is formed into a film by a so-called solution film formation process. The solution film formation process is available in a form of dry-wet process, dry process, and wet process. Of these, dry-wet and dry processes are preferred to obtain a film having good surface properties.

In the laminate film of the present invention, the surface not in contact with the resin layer A of the resin layer B (to be referred to as "exposed surface of the resin layer B" hereinafter) is rougher than the surface not in contact with the resin layer B of the resin layer A (to be referred to as "exposed surface of the resin layer A" hereinafter).

The exposed surface of the resin layer A has projections having an average height of 2 to 85 nm and an average width of 20 to 500 $\mu$m at a density of 4 to 2,500/mm$^2$. It can be said that the projection is a gently-sloped protuberance with an extremely large width for their height, compared with projection which is directly produced by the inert fine particles contained in the wholly aromatic polyamide base material.

When the projections have an average height of less than 2 nm or an average width of more than 500 $\mu$m, the film will be unsatisfactory in terms of transportation in the film formation process, scratch resistance of the film, roll formation, blocking phenomenon between films and further the running property of a tape under high-temperature and high-humidity conditions when the film is used as a base film for a thin metal film magnetic recording medium.

On the other hand, when the projections have an average height of more than 85 nm, the electromagnetic conversion characteristics of the film will deteriorate and the film will not be suitable as a base film for a high-density magnetic recording medium. When the projections have an average width of less than 20 $\mu$m and an average height of the projections of not more than 25 nm, transportability in the film formation process and the running property of a tape will be insufficient.

The average height of the projections is preferably 2 to 50 nm, more preferably 2 to 25 nm. The average width of the projections is preferably 20 to 300 $\mu$m, more preferably 20 to 200 $\mu$m. Further, the density of the projections is preferably 9 to 1,600/mm$^2$, more preferably 16 to 900/mm$^2$.

The projections formed on the exposed surface of the resin layer A may be formed by any known method without restriction, but it is advantageous to form the projections by making use of the action of thrusting up the resin layer A, which action is brought about by the inert fine particles in the biaxial orientation process since the resin layer B in contact with the resin layer A contains inert fine particles (to be referred as "inert fine particles B" hereinafter) in the present invention.

To develop this action efficiently, the thickness of the resin layer A and the average particle diameter of the inert fine particles B preferably satisfy the following expression (1):

$$4 \leq t_A/d_B \leq 40 \quad (1)$$

wherein $t_A$ is a thickness ($\mu$m) of the resin layer A and $d_B$ is an average particle diameter ($\mu$m) of the inert fine particles B.

The above inert fine particles B can be first particles having a particle size distribution of a standard deviation of 0.5 or less or second particles which consist of the first particles, which have the largest average diameter in the second particles, and other particles. In the above expression (1), when the inert fine particles B consist of the first particles alone, $d_B$ is an average particle diameter ($\mu$m) of the first particles and when the inert fine particles B consist of the second particles, $d_B$ is the largest average particle diameter ($\mu$m) of the first particles contained in the second particles.

The other particles contained in the second particles can be those particles other than and different from the first particles to be combined therewith.

$t_A/d_B$ is preferably in the range of 4 to 25, more preferably 4 to 16, particularly preferably 4 to 8.

The average particle diameter of the first particles or the average particle diameter of the first particles, which have the largest average particle diameter, contained in the second particles is preferably 0.2 to 1 $\mu$m, more preferably 0.2 to 0.8 $\mu$m, particularly preferably 0.2 to 0.6 $\mu$m. The content of the first particles (including the case where they are contained as part of the second particles) is preferably 0.001 to 5.0 wt %, more preferably 0.005 to 1 wt %, particularly preferably 0.01 to 0.5 wt %.

The above wide projections have an extremely large width or period compared with the wavelength (based on the projections of less than 1.0 $\mu$m) on the surface of a high-density magnetic recording medium, in particular, and do not have an adverse influence on the electromagnetic conversion characteristics because they have the same or smaller height than projections ascribed to the inert fine particles which the resin layer A may contain. The problems of the prior art base film for a high-density magnetic recording medium are all solved by the synergistic effect of the projections (if present) ascribed to the inert fine particles contained in the resin layer A, the wide projections and the rough surface of the resin layer B.

The resin layer A may contain inert fine particles. When it contains the inert particles, the inert fine particles (to be referred to as "inert fine particles A" hereinafter) preferably have an average particle diameter of 5 to 500 nm and a volume shape factor of 0.1 to $\pi/6$.

When the average particle diameter of the inert fine particles A is less than 5 nm, a satisfactory running durability will be difficult to obtain. On the other hand, when the average particle diameter is more than 500 nm, the electromagnetic conversion characteristics of a magnetic recording medium comprising the laminate film of the present invention will be unsatisfactory.

The average particle diameter of the inert fine particles A is preferably 10 to 200 nm, more preferably 30 to 120 nm.

The volume shape factor (f) represented by the following expression (2) is preferably 0.3 to $\pi/6$, more preferably 0.4 to $\pi/6$.

$$f = V/R^3 \quad (2)$$

wherein f is a volume shape factor, V is a volume of the particles ($\mu$m$^3$) and R is an average particle diameter ($\mu$m) of the particles.

A shape having a volume shape factor (f) of $\pi/6$ is a ball (sphere). Therefore, a shape of the particle having a volume shape factor (f) of 0.4 to $\pi/6$ is substantially a ball or sphere, or an elliptic ball like a rugby ball, all of which are particularly preferred. A sufficient running durability cannot be readily obtained with a particle having a volume shape factor (f) of less than 0.1, such as a needle-like particle.

The inert fine particles A are contained in an amount that the exposed surface of the resin layer A containing the particles A preferably has the projections at a density of $1 \times 10^3$ to $1 \times 10^7$/mm$^2$. The density is more preferably 7,500 to $1 \times 10^6$/mm$^2$, particularly preferably $1 \times 10^4$ to $1 \times 10^7$/mm$^2$.

When the density of the projections on the exposed surface is less than $1 \times 10^3$/mm$^2$, the running durability will deteriorate. On the other hand, when the density of the projections is more than $1 \times 10^7$/mm$^2$, the electromagnetic conversion characteristics of the magnetic recording media will deteriorate undesirably.

It is often desirable that the resin layer A should not substantially contain the inert fine particles, particularly externally added inert fine particles having an average particle diameter of larger than 5 nm. A magnetic layer is provided on the exposed surface of the resin layer A to form a magnetic recording medium. When the resin layer A contains the inert fine particles A, it is advantageous for improving the running durability. On the other hand, when the resin layer A does not contain the inert fine particles, it is advantageous for improving the electromagnetic conversion characteristics.

Preferred examples of the inert fine particles A for the resin layer A include (1) heat resistant polymer particles (such as particles of cross-linked silicone resins, cross-linked polystyrene, cross-linked acrylic resins, melamine-formaldehyde resins, aromatic polyamide resins, polyimide resins, polyamideimide resins, cross-linked polyesters and the like), (2) metal oxides (such as aluminum oxide (alumina), titanium dioxide, silicon dioxide, magnesium oxide, zinc oxide, zirconium oxide and the like), (3) metal carbonates (such as magnesium carbonate, calcium carbonate and the like), (4) metal sulfates (such as calcium sulfate, barium sulfate and the like), (5) carbon (such as carbon black, graphite, diamond and the like), (6) clay minerals (such as kaolin, clay, bentonite and the like), and (7) metal hydroxides (such as calcium hydroxide and the like). Of these, cross-linked silicone resin particles, cross-linked polystyrene particles, melamine-formaldehyde resin particles, polyamideimide resin particles, aluminum oxide (alumina), titanium dioxide, silicon dioxide, zirconium oxide, synthetic calcium carbonate, calcium hydroxide, barium sulfate, diamond and kaolin are preferred, and cross-linked silicone resin particles, cross-linked polystyrene particles, alumina, titanium dioxide, silicon dioxide, calcium hydroxide and synthetic calcium carbonate are particularly preferred.

Preferred examples of the inert fine particles B for the above resin layer B include fine particles consisting of thermoresistant organic high molecules such as cross-linked silicone resins, cross-linked polystyrene, cross-linked styrene-divinylbenzene copolymers, polymethyl methacrylate, methyl methacrylate copolymers, cross-linked methyl methacrylate copolymers, polytetrafluoroethylene, polyvinylidene fluoride, polyacrylonitrile, benzoguanamine resins, and the like; and fine particles of inorganic compounds such as silica, alumina, titanium dioxide, kaolin, talc, graphite, calcium carbonate, feldspar, molybdenum disulfide, carbon black, barium sulfate, and the like.

As the other particles in the case where the inert particles B consist of the second particles, colloidal silica and alumina having such a crystal form as α, γ, δ, θ or the like are preferably used particularly for the inert fine particles B, in addition to the above fine particles having an average particle diameter of 0.001 to 0.2 μm.

In the laminate film of the present invention, the exposed surface of the resin layer A preferably has a center plane average roughness $^A\text{WR}_a$ of not more than 10 nm, more preferably not more than 5 nm, much more preferably not more than 2 nm, particularly preferably not more than 1 nm.

The exposed surface of the resin layer B preferably has a center plane average roughness $^B\text{WR}_a$ of 2 nm or more and less than 15 nm. $^B\text{WR}_a$ is more preferably 3 to 10 nm, particularly preferably 3 to 7 nm.

Further, it is advantageous that $^B\text{WR}_a$ be preferably larger than $^A\text{WR}_a$ by not less than 1 nm, more preferably not less than 1.5 nm.

When $^B\text{WR}_a$ is larger than 15 nm, the wide projections on the exposed surface of the resin layer A will be difficult to have the above height and width. When $^B\text{WR}_a$ is less than 2 nm, handling properties such as transportability and the running property of a tape formed of such laminate film will be unsatisfactory.

Further, when $^B\text{WR}_a$ is smaller than $^A\text{WR}_a$, handling properties such as transportation in the process of film formation, scratching, wind-up and unwinding will deteriorate due to the flat surface of the resin layer B, a blocking phenomenon will occur due to deteriorated slipperiness between films, roll formation will deteriorate, and productivity and yield of product will decline, thereby boosting production costs disadvantageously.

In the present invention, the wholly aromatic polyamide is formed into a film by the so-called solution film formation process as described above. Each of dry-wet, dry, and wet processes for the solution film formation process will be described below.

To form a film by the wet process, preferably, a stock solution for film formation is directly extruded from a die into a film formation bath, or extruded first onto a base such as a drum and then introduced into a wet bath together with the base. This bath generally contains aqueous medium, while it may contain an organic solvent, inorganic salt or the like-in addition to water. Salts, organic solvent and the like contained in the film can be extracted by causing the film to pass through the wet bath. The amount of time spent for the film to pass through the whole wet bath, which differs depending on the thickness of the film, Is preferably 10 seconds to 30 minutes. Further, the film is stretched in a longitudinal direction, dried, stretched in a transverse direction and heat set. These treatments are generally carried out at 100 to 500° C. for a total time of 1 second to 30 minutes.

To form a film by the dry-wet process, a stock solution for film formation is extruded onto a base such as a drum, endless belt or the like from a die to form a thin film, which is then dried until it acquires self-holding properties by removing the solvent from the thin film layer. The drying conditions include a temperature ranging from a room temperature to 300° C. and a time of 60 minutes or less. The dried film is removed from the base, introduced into a wet step where a salt and a solvent are removed like the above wet process, stretched, dried and heat set to form a film.

When the dry process is employed, a film having self-holding properties is obtained by drying on a drum or an endless belt. The film is then removed from the base, dried to remove the residual solvent, stretched and heat set. These treatments are carried out at 100 to 500° C. for 1 second to 30 minutes.

As described above, the film is stretched during the film formation process and the stretch ratio is preferably 0.8 to 10.0, more preferably 1.1 to 9.0 in terms of area magnification (the term "area magnification" is defined by a value obtained by dividing the area of a film after stretching by the area of a film before stretching. A value of 1 or less means relaxation).

To form the laminate film of the present invention, a stock solution for the resin layer A and a stock solution for the resin layer B can be formed into a laminate in a combined tube or in a die by a known process as disclosed by JP-A 56-162617. Casting is preferably carried out in such a way that the resin layer B is in contact with the base, because the surface of the resin layer A can be kept smooth. Alternatively, a film having self-holding properties is formed from either one of the stock solutions, the other stock solution is cast over the film, whereby the solvent is removed to form a laminate film. Particularly when a laminate film is formed in a combined tube or die, the viscosity of each of the stock solutions is preferably adjusted to 100 to 10,000 poise. When the viscosity is less than 100 poise, the two solutions readily mix before getting out of the die and, in the case of a thin film, the surface of the resin layer A becomes rough even though they mix in trace amounts. On the other hand, when the viscosity is more than 10,000 poise, the mixing of the two solutions hardly occurs, while the surface of a film becomes rough easily due to the occurrence of a melt fracture undesirably.

Although the two solutions preferably have the same viscosity, there may be a slight difference therebetween. Taking one solution having a lower viscosity as a reference, the viscosity of the other solution having a higher viscosity should be 200 % or less to be safe.

Further, when the dry process and the dry-wet process are employed, the two solutions may mix in the drying step. When the stock solution cast over the base is heated, its viscosity lowers once and then rises again due to the evaporation of the solvent. When the viscosity falls below 10 poise, the two solutions readily mix. Therefore, drying conditions must be fully controlled to prevent the viscosity from falling below 10 poise. For example, the drying temperature is preferably elevated at least in two steps.

The wholly aromatic polyamide laminate film of the present invention can be produced as described above. An aqueous coating solution of a water-dispersible or water-soluble polymer may be further coated on the wholly aromatic polyamide laminate film as a pretreatment before a magnetic layer or the like is formed thereon, and the resulting laminate film may be stretched and dried as required to improve the adhesion of the film to the magnetic layer. To the aqueous coating solution may be added an antistatic agent, surfactant, fine particles and the like according to application purpose.

In the production of the laminate film, the wholly aromatic polyamide may contain additives other than the above inert fine particles as desired, such as a stabilizer, colorant and the like.

The laminate film of the present invention preferably has a total Young's modulus, obtained by adding up a Young's modulus in each of two directions crossing each other at right angles, e.g., in longitudinal and transverse directions, of 2,000 kg/mm² or more. When this value is less than 2,000 kg/mm², the contact of the magnetic tape consisting of the laminate film with the magnetic head becomes easily unstable and the electromagnetic conversion characteristics of the laminate film are liable to deteriorate. The total of Young's moduli in longitudinal and transverse directions is more preferably 2,200 kg/mm² or more, much more preferably 2,400 kg/mm² or more, and particularly preferably 2,500 kg/mm² or more, and its upper limit is 4,500 kg/mm². The Young's modulus in each of the longitudinal and transverse directions is preferably 600 kg/mm² or more, more preferably 800 kg/mm² or more, and particularly preferably 1,000 kg/mm² or more, and its upper limit is 3,500 kg/mm².

In the present invention, the total thickness of the laminate film is generally 1.0 to 20 µm, preferably 2.0 to 10 µm, more preferably 3.0 to 10 µm. The thickness of each of the resin layer A and the resin layer B is suitably set according to the average particle diameter $d_b$ of the inert particles B to be added to the resin layer B and the thickness $t_A$ of the resin layer A so that undulated projections are produced on the surface of the resin layer A. The thickness $t_A$ of the resin layer A is preferably 0.3 µm or more, more preferably 0.8 µm or more, and the thickness $t_B$ of the resin layer B is preferably ½ or more of the above average particle diameter $d_b$ (µm) of the inert fine particles B.

From the laminate film of the present invention, there can be formed a deposition type magnetic recording medium for high-density recording, which is, in particular, excellent in output at a short wavelength range and electromagnetic conversion characteristics such as S/N and C/N and which is almost free from a drop-out and error rate by forming a thin ferromagnetic metal layer of iron, cobalt, chromium or an alloy or oxide comprising them as a main component on the exposed surface of the resin layer A by means of vacuum deposition, sputtering or ion plating, a protective layer of diamond-like carbon (DLC) or the like and a fluorine-containing carboxylic acid-based lubricant layer on the surface of the thin ferromagnetic metal layer in the order named, and further a known back-coat layer on the exposed surface of the resin layer B, according to use and application and as required. This deposition type electromagnetic recording medium is extremely useful as a tape medium for analog signal recording Hi8, digital video cassette recorder (DVC) for digital signal recording, data 8 mm and DDSIV.

In other words, according to the present invention, secondly, there is also provided a magnetic recording medium consisting of the laminate film of the present invention and a magnetic recording layer formed on the exposed surface of the layer A.

From the laminate film of the present invention, there can also be formed a metal-coated magnetic recording medium for high-density recording which is, in particular, excellent in output at a short wavelength range, and electromagnetic conversion characteristics such as S/N and C/N and which is almost free from a drop-out and error rate by uniformly dispersing needle-like magnetic fine powders of iron or containing iron as a main component in a binder such as vinyl chloride or vinyl chloride-vinyl acetate copolymer, coating the resulting dispersion on the exposed surface of the resin layer A to ensure that the thickness of a magnetic layer be 1 µm or less, preferably 0.1 to 1 µm, and in some cases, further forming a back-coat layer on the exposed surface of the resin layer B by a known method. Titanium oxide fine particles may be dispersed in the same organic binder as that for the magnetic layer and the resulting dispersion may be coated on the resin layer A as required to form a non-magnetic layer as an underlying layer of the metal powder-containing magnetic layer. This metal-coated magnetic recording medium is extremely useful as a tape medium for an analog signal recording 8 mm video, Hi8, β-cam SP, W-VHS, digital video cassette recorder (DVC) for digital signal recording, data 8 mm, DDSIV, digital β-cam, D2, D3, SX, and the like.

Further, from the laminate film of the present invention, there can be formed a deposition type magnetic recording medium for high-density recording which is, in particular, excellent in output at a short wavelength range, and electromagnetic conversion characteristics such as S/N and C/N and which is almost free from a drop-out and error rate by uniformly dispersing needle-shaped fine magnetic powders such as iron oxide or chromium oxide, or lamellar magnetic fine powders such as barium ferrite in a binder such as vinyl chloride or vinyl chloride-vinyl acetate copolymer, coating the resulting dispersion on the exposed surface of the resin layer A to ensure that the thickness of a magnetic layer be 1 µm or less, preferably 0.1 to 1 µm, and if necessary, further forming a back-coat layer on the front surface of the thermoplastic resin layer B by a known method. Titanium oxide fine particles may be dispersed in the same organic binder as that for the magnetic layer and the resulting dispersion may be coated on the layer A as required to form a non-magnetic layer as an underlying layer of the metal powder-containing magnetic layer. This oxide-coated magnetic recording medium is useful as a high-density oxide coated magnetic recording medium such as a data streamer QIC for digital signal recording.

The above-described W-VHS is a VTR for analog HDTV signal recording and DVC is applicable to digital HDTV signal recording. It can be said that the film of the present invention is an extremely useful base film for a magnetic recording medium for these VTRs applicable to HDTV signal.

The following examples are given to further illustrate the present invention. Measurement methods used in the present invention are as follows.

(1) Average particle diameter I of particles (average particle diameter: 0.06 µm or larger)

This was measured using the CP-50 model Centrifugal Particle Size Analyzer of Shimadzu Corporation. A particle diameter, "equivalent sphere diameter" equivalent to 50 wt %, was read from a cumulative curve of the particles of each diameter and the amount thereof calculated based on the obtained centrifugal sedimentation curve, and taken as the average particle diameter (refer to "Book of Particle Size Measurement Technology" issued by Nikkan Kogyo Press, pp. 242–247, 1975).

(2) Average particle diameter II of particles (average particle diameter: smaller than 0.06 µm)

Particles having an average particle diameter smaller than 0.06 µm which form small projections were measured by a light scattering method. That is, it was expressed by the "equivalent sphere diameter" of the particles which account for 50 wt % of the total of all particles obtained by the NICOMP Model 270 Submicron Particle Sizer of Nicomp Instruments Inc.

(3) Volume shape factor f

A photo of each particle is taken with a magnification for each size by a scanning electron microscope. The average diameter and the volume of the particle are calculated from the photo using an image analyzer Luzex 500 of Nippon Regulator Co. Ltd. and the volume shape factor f is obtained from the following expression (3).

$$f = V/R^3 \qquad (3)$$

wherein V is a volume of the particle (µm³) and R is the average diameter of the particle (µm).

(4) Layer thickness

The thickness of a film is measured at 10 locations of the film at random by a micrometer, and an average value of the measurement values is taken as the total thickness of the film. The thickness of a thin layer is measured by the following method, while the thickness of a thick layer is obtained by subtracting the thickness of the thin layer from the total thickness. That is, using a secondary ion mass spectrometer (SIMS), the concentration ratio ($M^+/C^+$) of an element to the carbon element of the wholly aromatic polyamide is taken as a particle concentration, and the portion from the surface up to a depth of 5,000 nm is analyzed in the thickness direction, where the element $M^+$ is the element with the highest concentration in the layer, the thickness of which is to be measured. In the vicinity of the surface of the layer, the particle concentration is measured to be low but becomes higher as the distance of the measured point from the surface increases. In the case of the present invention, there are two cases, that is, one case is a case where after the particle concentration becomes a stable value 1, it increases or decreases to a stable value 2, and the other is a case where after the particle concentration becomes a stable value 1, it decreases continuously. Based on this distribution curve, in the former case, a depth which provides a particle concentration of (stable value 1+stable value 2)/2 is taken as the thickness of the layer whereas in the latter case, a depth that provides a particle concentration of one-half of the stable value 1 (deeper than the depth giving a stable value 1) is taken as a thickness of the layer. Measurement conditions are as follows.

(a) Measuring instrument secondary ion mass spectrometer (SIMS); Model 6300, manufactured by Perkin Elmer Co., Ltd.

(b) Measurement conditions kind of primary ions: $O_2+$ acceleration voltage of primary ions: 12 kV current of primary ions: 200 nA luster area: 400 $\mu$m×400 $\mu$m analysis area: gate 30% measurement vacuum degree: $6.0\times10^{-9}$ Torr

E-GUNN: 0.5 kV–3.0 A

In the case where the most of particles contained in an area of from the surface layer to a depth of 5,000 nm are organic polymer particles other than a cross-linked silicone resin, it is difficult to measure them with SIMS. Therefore, a concentration distribution curve similar to the above is measured by FT-IR (Fourier transform infrared spectrometry) or XPS (X-ray photo-electron spectrometry) to obtain a thickness of the layer while the film is etched gradually from the surface.

(5) Projections having an average height of 2 to 85 nm and an average width of 20 to 500 $\mu$m on film surface Using the non-contact 3-D roughness meter (TOPO-3D) of WYKO Co., the measurement is made under such conditions as a measurement area of 234 $\mu$m×240 $\mu$m (0.056 mm$^2$) and a measurement magnification of 40 or a measurement area of 956 $\mu$m×980 $\mu$m (0.937 mm$^2$) and a measurement magnification of 10 depending on the size and height of the projections, and the average height and average width of the projections are read from the obtained 3-D chart. In this measurement, a sample cut off in the direction at an angle of 5° to 10° with the longitudinal direction of the film was used.

(6) Non-contact 3-D center plane average roughness (WR$_a$)

Using the non-contact 3-D roughness meter (TOPO-3D) of WYKO Co., the measurement is made under such conditions as a measurement area of 242 $\mu$m×239 $\mu$m (0.058 mm$^2$) and a measurement magnification of 40, and WR$_a$ is calculated based on the following expression (4) from the surface analysis using software built in the roughness meter.

$$WRa = \sum_{k=1}^{M}\sum_{j=1}^{N} |Z_{jk} - \overline{Z}|/(M \cdot N) \qquad (4)$$

wherein $$\overline{Z} = \sum_{k=1}^{M}\sum_{j=1}^{N} Z_{jk}/(M \cdot N)$$

$Z_{jk}$ is a height on the 3-D roughness chart at a j-th position and a k-th position in each of the directions when a measurement direction (242 $\mu$m) and a direction (239 $\mu$m) perpendicular to it are divided into M and N sections, respectively.

(7) Young's modulus

Using the Tensilon tensile tester of Toyo Baldwin Co., Ltd., a 300 mm long and 12.7 mm wide sample film is pulled at a strain rate of 10% per minute in a chamber controlled to a temperature of 20° C. and a humidity of 50%, and an initial straight line portion of the tensile stress-strain curve is used to calculate the Young's modulus of the film based on the following expression (5).

$$E = \Delta\sigma/\Delta\epsilon \qquad (5)$$

wherein E is a Young's modulus (kg/mm$^2$), $\Delta\sigma$ is a stress difference between two points on a straight line due to the initial average sectional area, and $\Delta\epsilon$ is a strain difference between the two points.

(8) Wind-up property

After wind-up conditions at the time of slitting are optimized, a 560 mm wide and 9,000 m long film is slit and rolled onto 10 rolls which are then left for one week. The wind-up property of the rolls is evaluated based on the following criteria from the number of rolls which can be commercialized judged from the state of occurrence of film wrinkles.

| number of commercializable rolls | evaluation |
| --- | --- |
| 9 or more | ⊙ |
| 7 to 8 | ○ |
| 4 to 6 | × |
| 3 or less | ×× |

(9) Production of magnetic tape and evaluation of characteristics

Two 100% cobalt ferromagnetic thin film layers are formed on the surface of the outermost layer A of a biaxially oriented laminate film by a vacuum deposition method so as to have a total thickness of 0.2 $\mu$m (each layer having a thickness of about 0.1 $\mu$m), a diamond-like carbon (DLC) film layer and a fluorine-containing carboxylic acid-based lubricant layer are formed sequentially on the above surface of the thin film layers, and a back coat layer is further formed on the surface of the resin layer B by a known method. Thereafter, the resulting laminate is slit to a width of 8 mm and the thus obtained tape is loaded into a commercial 8 mm video cassette. Then the following characteristics of this tape are measured.

apparatus used: 8 mm video tape recorder, EDV-6000 of Sony Corporation

C/N measurement: noise meter of Shibasoku Co., Ltd.

(a) C/N measurement

A signal having a recording wavelength of 0.5 μm (frequency of about 7.4 MHz) is recorded, the ratio of values of its reproduced signal at 6.4 MHz and 7.4 MHz is taken as the C/N of the tape which is expressed as a relative value when the C/N of a deposited tape for a commercial 8 mm video is 0 dB.

(b) Running durability

An image signal of 4.2 MHz is recorded on the above deposited tape and output fluctuations are checked after the tape is caused to run 200 cycles under the conditions of 25° C. and 50% RH, each cycle consisting of winding at a speed of 41 m/min and rewinding at a speed of 41 m/min. The running durability is judged based on the following evaluation criteria.

◎: Output fluctuations after 200 cycles are 0 dB to −0.3 dB.

○: Output fluctuations after 200 cycles are less than 0.3 dB to −0.6 dB.

X: Output fluctuations after 200 cycles are less than −0.6 dB.

(10) Scratch resistance of film

After slitting, a film is sampled from the final product roll and the smooth surface of the film is observed through an optical microscope at a magnification of 100 to count the number of scratches within 20 fields of view. The evaluation criteria are as follows.

| number of scratches | evaluation |
|---|---|
| 0 | ◎ |
| 1 | ○ |
| 2 or 3 | × |
| 4 or more | ×× |

(11) Density of projections

The density of projections on the surface of the film is measured with a scanning electron microscope. That is, 25 photomicrographs of the surface of the resin layer A of the laminate film are taken at random at a magnification of 5,000X, the number of projections observed on the surface in each photomicrograph is counted, and the number of projections per 1 mm² is determined by averaging the number of projections observed on the surface in each photomicrograph and taken as the density of projections on the surface of the resin layer A.

EXAMPLE 1

Mol % of paraphenylenediamine and 25 mol % of 3,4′-diaminodiphenyl ether as amine components and 50 mol % of terephthalic acid chloride as an acid component were polymerized in NMP (N-methylpyrrolidone) and the resulting polymer was neutralized with calcium hydroxide to obtain a polymer solution (having a logarithmic viscosity of 3.5). This solution was divided into two portions. To one (for resin layer A) of them were added spherical silica particles having an average particle diameter of 50 nm and a volume shape factor of 0.5, which had been dispersed in NMP in advance. To the other (for resin layer B) were added likewise spherical silica particles having an average particle diameter of 0.5 μm and θ-alumina particles having an average particle diameter of 0.1 μm to concentrations of 0.05 wt % and 0.2 wt %, respectively. Stock solutions for film formation were prepared by adjusting the viscosities of the two polymer solutions to 1,000 poise at 100° C.

These stock solutions were formed into a laminate film comprising a resin layer A having a final thickness of 3.5 μm and a resin layer B having a final thickness of 0.5 μm, cast over a metal belt heated at 100° C., dried at 100° C. for 2 minutes, and then dried at 120° C. and 150° C. consecutively for a total time of 10 minutes to obtain an unoriented film having self-holding properties. The laminate film was formed such that the resin layer B was in contact with the belt. This unoriented film was removed from the belt continuously and introduced into a water tank to remove the solvent and salt.

The obtained unoriented film was stretched between low-speed and high-speed rolls to 2.7 times at a film temperature of 250° C., supplied to a tenter and stretched to 2.7 times at 350° C. to obtain a biaxially oriented film. The obtained biaxially oriented film was heat set at 380° C. for 1 minute to obtain a polyamide laminate film having a final thickness of 4.0 μm.

The characteristic properties of the obtained laminate film and a ferromagnetic thin film deposited magnetic tape comprising this film are shown in Table 2.

EXAMPLES 2 TO 4 AND COMPARATIVE EXAMPLES 1 AND 2

Wholly aromatic polyamide laminate films were obtained in the same manner as in Example 1 except that the particles to be added to the resin layer A and the resin layer B and the thicknesses of each of the resin layer A and the resin layer B were changed as shown in Table 1 and the stretch ratios were changed. The film of Example 2 was stretched to 2.1 times in a longitudinal direction and to 2.5 times in a transverse direction, the film of Example 3 was stretched to 3.0 times in a longitudinal direction and to 1.7 times in a transverse direction, the film of Example 4 was stretched to 1.8 times in a longitudinal direction and 2.9 times in a transverse direction, the film of Comparative Example 1 was stretched to 2.1 times in both directions, and the film of Comparative Example 2 was stretched to 2.5 times in both directions.

The characteristic properties of the obtained films and ferromagnetic thin film deposited magnetic tapes comprising the films are shown in Table 2.

EXAMPLE 5

A polyamide laminate film was obtained in the same manner as in Example 1 except that the ratio of the amine components and the particles to be added to the resin layer B were changed as shown in Table 1 and that the film was stretched to 2.0 times in a longitudinal direction and to 2.7 times in a transverse direction. The characteristic properties of the film and a ferromagnetic thin film deposited magnetic tape comprising the film are shown in Table 2.

Comparative Example 3

2,6-dimethyl naphthalate dicarboxylate and ethylene glycol were polymerized in accordance with a commonly used method by adding manganese acetate as an ester exchange catalyst, antimony trioxide as a polymerization catalyst, phosphorous acid as a stabilizer and inert particles shown in Table 1 as a lubricant to obtain polyethylene naphthalates (PEN) having an intrinsic viscosity of 0.60 (in orthochlorophenol, at 35° C.) for layer A and layer B (resin A and resin B, respectively). These were dried at 170° C. for 6 hours, supplied to two extruders, molten at 310° C., co-extruded from a multi-manifold co-extrusion die into a laminate having the resin layer B formed on one surface of the resin layer A. The laminate film was quenched to obtain a 100 μm-thick unoriented laminate film.

The obtained unoriented laminate film was preheated, stretched to 5.0 times between low-speed and high-speed rolls at a film temperature of 130° C., quenched, supplied to a tenter, and then stretched to 5.0 times in a transverse direction at 140° C. The obtained biaxially oriented laminate film was heat set with hot air heated at 210° C. for 4 seconds to obtain a 4.0 μm-thick biaxially oriented laminate polyester film. The thickness of each layer was adjusted by controlling the discharge amounts of the two extruders.

The characteristic properties of this laminate film and a ferromagnetic thin film deposited magnetic tape comprising the film are shown in Table 2.

TABLE 1

| | polymer composition (mol %) | | | particles contained in resin layer A | | | |
|---|---|---|---|---|---|---|---|
| | acid component | amine components | | | particle diameter | volume shape | density of particles on film surface |
| | TPC | PPD | 3,4'-DAPE | kind | nm | factor | (number/mm²) |
| Example 1 | 50 | 25 | 25 | silica | 50 | 0.5 | 7 × 10⁴ |
| Example 2 | 50 | 25 | 25 | silica | 10 | 0.5 | 200 × 10⁴ |
| Example 3 | 50 | 25 | 25 | silica | 100 | 0.5 | 2 × 10⁴ |
| Example 4 | 50 | 25 | 25 | silicone | 60 | 0.5 | 3 × 10⁴ |
| Example 5 | 50 | 15 | 35 | calcium hydroxide | 100 | 0.3 | 0.8 × 10⁴ |
| Comparative Example 1 | 50 | 25 | 25 | silicone | 50 | 0.5 | 7 × 10⁴ |
| Comparative Example 2 | 50 | 25 | 25 | silica | 50 | 0.5 | 7 × 10⁴ |
| Comparative Example 3 | polyethylene naphthalate | | | silica | 50 | 0.5 | 7 × 10⁴ |

| | particles 1 contained in resin layer B | | | particles 2 contained in resin layer B | | | thickness | |
|---|---|---|---|---|---|---|---|---|
| | kind | particle diameter μm | content wt % | kind | particle diameter μm | content wt % | resin layer A μm | resin layer B μm |
| Example 1 | silica | 0.5 | 0.05 | θ-alumina | 0.1 | 0.20 | 3.5 | 0.5 |
| Example 2 | silicone | 0.4 | 0.03 | titanium oxide | 0.2 | 0.20 | 3.0 | 0.5 |
| Example 3 | calcium hydroxide | 0.7 | 0.03 | — | — | — | 9.5 | 0.5 |
| Example 4 | silica | 0.3 | 0.20 | silica | 0.1 | 0.30 | 7.0 | 3.0 |
| Example 5 | calcium carbonate | 0.6 | 0.02 | silica | 0.1 | 0.30 | 3.0 | 2.0 |
| Comparative Example 1 | calcium hydroxide | 2.0 | 0.10 | — | — | — | 3.5 | 0.5 |
| Comparative Example 2 | silica | 0.3 | 0.20 | silica | 0.1 | 0.30 | 3.9 | 0.1 |
| Comparative Example 3 | silica | 0.5 | 0.05 | — | — | — | 3.5 | 0.5 |

Note:
TPC: terephthalic acid chloride
PPD: paraphenylenediamine
3,4'-DAPE: 3,4'-diaminodiphenyl ether
These shall be applied to the following Tables.

TABLE 2

| | Young's modulus | | | projection on surface of resin layer A | | | | surface roughness Ra | |
|---|---|---|---|---|---|---|---|---|---|
| | longitudinal direction kg/mm² | transverse direction kg/mm² | kg/mm² | degree in measurement direction | height nm | width nm | density (number/mm²) | resin layer A (nm) | resin layer B (nm) |
| Example 1 | 1500 | 1500 | 3000 | 9 | 6 | 70 | 130 | 0.6 | 2.8 |
| Example 2 | 1100 | 1400 | 2500 | 9 | 4 | 50 | 200 | 0.4 | 2.2 |
| Example 3 | 1800 | 700 | 2500 | 5 | 11 | 120 | 60 | 0.6 | 5.5 |
| Example 4 | 800 | 1700 | 2500 | 5 | 7 | 30 | 500 | 0.7 | 4.0 |
| Example 5 | 1000 | 1500 | 2500 | 9 | 20 | 190 | 19 | 1.6 | 7.0 |
| Comparative Example 1 | 1100 | 1100 | 2200 | 9 | 350 | 600 | 1 | 11.0 | 27.0 |
| Comparative | 1400 | 1400 | 2800 | 9 | — | — | — | 0.7 | 0.8 |

TABLE 2-continued

| | Young's modulus | | | projection on surface of resin layer A | | | | surface roughness Ra | |
|---|---|---|---|---|---|---|---|---|---|
| Example 2 Comparative Example 3 | 700 | 700 | 1400 | 9 | 7 | 80 | 170 | 0.6 | 2.9 |

| | wind-up property | scratch resistance | running durability | electromagnetic conversion characteristics C/N λ = 0.5 μm |
|---|---|---|---|---|
| Example 1 | ○ | ○ | ○ | +3.0 |
| Example 2 | ○ | ○ | ○ | +1.5 |
| Example 3 | ◎ | ○ | ◎ | +1.0 |
| Example 4 | ○ | ○ | ○ | +2.0 |
| Example 5 | ◎ | ◎ | ◎ | +0.5 |
| Comparative Example 1 | ◎ | ◎ | ○ | −8.0 |
| Comparative Example 2 | ×× | ×× | ○ | +4.0 |
| Comparative Example 3 | × | × | × | −2.0 |

EXAMPLE 6

25 Mol % of paraphenylenediamine and 25 mol % of 3,4'-diaminodiphenyl ether as amine components, and 50 mol % of terephthalic acid chloride as an acid component were polymerized in NMP (N-methylpyrrolidone) and the resulting polymer was neutralized with calcium hydroxide to obtain a polymer solution (having a logarithmic viscosity of 3.5). This solution was divided into two portions. To one (for resin layer B) of them were added spherical silica particles having an average particle diameter of 0.4 μm, which had been dispersed in NMP in advance, to a concentration of 0.05 wt %. Stock solutions for film formation were prepared by adjusting the viscosities of the two polymer solutions to 1,000 poise at 100° C.

A laminate film comprising a resin layer A having a final thickness of 3.0 μm and a resin layer B having a final thickness of 1.0 μm was formed in a die from these stock solutions, cast over a metal belt heated at 100° C., dried at 100° C. for 2 minutes, and then dried at 120° C. and 150° C. consecutively for a total time of 10 minutes to obtain an unoriented film having self-holding properties. The film was formed such that the resin layer B was in contact with the belt. This unoriented film was removed form the belt continuously and introduced into a water tank to remove the solvent and salt.

The obtained unoriented film was stretched to 2.0 times between low-speed and high-speed rolls at a film temperature of 250° C., supplied to a tenter and stretched to 2.7 times at 350° C. to obtain a biaxially oriented film. The obtained biaxially oriented film was heat set at 380° C. for 1 minute to obtain a polyamide laminate film having a final thickness of 4.0 μm.

The characteristic properties of the obtained laminate film and a ferromagnetic thin film deposited magnetic tape comprising this film are shown in Table 4.

EXAMPLES 7 TO 9 AND COMPARATIVE EXAMPLES 4 TO 6

Biaxially oriented laminate films were obtained in the same manner as in Example 6 except that the particles to be added to the resin layer A and the resin layer B and the thickness of each of the resin layers A and B were changed as shown in Table 3 and the stretch ratios were changed (Comparative Example 6 was a single-layer film). The films of Example 7 and Comparative Example 6 were stretched to 2.5 times in a longitudinal direction and to 2.5 times in a transverse direction, the film of Example 8 was stretched to 2.3 times in a longitudinal direction and to 2.9 times in a transverse direction, the film of Example 9 was stretched to 1.7 times in a longitudinal direction and to 3.4 times in a transverse direction, and the films of Comparative Examples 4 and 5 were stretched to 2.0 times in a longitudinal direction and to 2.7 times in a transverse direction.

The characteristic properties of the obtained films and ferromagnetic thin film deposited magnetic tapes comprising the films are shown in Table 4.

EXAMPLE 10

A polyamide laminate film was obtained in the same manner as in Example 6 except that the ratio of the amine components and the particles to be added to the resin layer B were changed as shown in Table 3 and that the film was stretched to 2.9 times in a longitudinal direction and to 1.6 times in a transverse direction. The characteristic properties of the obtained film and a ferromagnetic thin film deposited magnetic tape comprising the film are shown in Table 4.

Comparative Example 7

Dimethyl terephthalate and ethylene glycol were polymerized in accordance with a commonly used method by adding manganese acetate as an ester interchange catalyst, antimony trioxide as a polymerization catalyst, phosphorous acid as a stabilizer and inert particles shown in Table 3 as a lubricant to obtain polyethylene terephthalates (PET) having an intrinsic viscosity of 0.60 (in orthochlorophenol, at 35° C.) for the resin layer A and the resin layer B (resin A and resin B, respectively). The obtained resin A and resin B were dried at 170° C. for 3 hours, supplied to two extruders, molten at 300° C., co-extruded from a multi-manifold co-extrusion die into a laminate film having the resin layer B formed on one surface of the resin layer A. The laminate film was quenched to obtain a 56 μm-thick unoriented laminate film.

The obtained unoriented laminate film was preheated, stretched to 3.5 times between low-speed and high-speed rolls at a film temperature of 85° C., quenched, supplied to a tenter, and then stretched to 4.0 times in a transverse direction at 105° C. The obtained biaxially oriented laminate film was heat set with hot air heated at 210° C. for 4 seconds to obtain a 4.0 μm-thick biaxially oriented laminate polyester film. The thickness of each layer was adjusted by controlling the discharge amounts of the two extruders.

The characteristic properties of this laminate film and a ferromagnetic thin film deposited magnetic tape comprising the film are shown in Table 4.

TABLE 3

| | polymer composition (mol %) | | | particles contained in resin layer A | | |
|---|---|---|---|---|---|---|
| | acid component | amine components | | | | |
| | TPC | PPD | 3,4'-DAPE | kind | particle diameter μm | content wt % |
| Example 6 | 50 | 25 | 25 | — | — | — |
| Example 7 | 50 | 25 | 25 | — | — | — |
| Example 8 | 50 | 25 | 25 | — | — | — |
| Example 9 | 50 | 25 | 25 | — | — | — |
| Example 10 | 50 | 12 | 38 | — | — | — |
| Comparative Example 4 | 50 | 25 | 25 | — | — | — |
| Comparative Example 5 | 50 | 25 | 25 | — | — | — |
| Comparative Example 6 | 50 | 25 | 25 | — | — | — |
| Comparative Example 7 | polyethylene terephthalate | | | — | — | — |

| | particles 1 contained in resin layer B | | | particles 2 contained in resin layer B | | | thickness | |
|---|---|---|---|---|---|---|---|---|
| | kind | particle diameter μm | content wt % | kind | particle diameter μm | content wt % | resin layer A μm | resin layer B μm |
| Example 6 | silica | 0.4 | 0.05 | — | — | — | 3.0 | 1.0 |
| Example 7 | silicone | 0.5 | 0.03 | θ-alumina | 0.1 | 0.20 | 4.0 | 0.5 |
| Example 8 | calcium hydroxide | 0.5 | 0.04 | — | — | — | 2.0 | 0.5 |
| Example 9 | titanium oxide | 0.2 | 0.40 | silica | 0.1 | 0.30 | 2.0 | 2.0 |
| Example 10 | calcium carbonate | 0.5 | 0.05 | — | — | — | 7.0 | 4.0 |
| Comparative Example 4 | silicone | 1.2 | 0.03 | silica | 0.1 | 0.20 | 2.5 | 1.5 |
| Comparative Example 5 | silica | 0.1 | 0.50 | — | — | — | 6.0 | 0.5 |
| Comparative Example 6 | — | — | — | — | — | — | 4.0 | |
| Comparative Example 7 | silica | 0.4 | 0.10 | — | — | — | 3.0 | 1.0 |

TPC: terephthalic acid chloride
PPD: paraphenylenediamine
3,4'-DAPE: 3,4'-diaminodiphenyl ether

TABLE 4

| | Young's modulus | | | projection on surface of resin layer A | | | | surface roughness Ra | |
|---|---|---|---|---|---|---|---|---|---|
| | longitudinal direction kg/mm² | transverse direction kg/mm² | kg/mm² | degree in measurement direction | height nm | width nm | density (number/mm²) | resin layer A (nm) | resin layer B (nm) |
| Example 6 | 1000 | 1500 | 2500 | 9 | 7 | 60 | 180 | 0.5 | 3.0 |
| Example 7 | 1400 | 1400 | 2800 | 9 | 5 | 110 | 90 | 0.5 | 2.5 |
| Example 8 | 1300 | 1700 | 3000 | 5 | 8 | 140 | 80 | 1.5 | 4.0 |
| Example 9 | 700 | 2000 | 2700 | 9 | 4 | 30 | 450 | 1.0 | 3.5 |
| Example 10 | 1700 | 600 | 2300 | 5 | 12 | 160 | 25 | 0.5 | 7.0 |
| Comparative Example 4 | 1000 | 1500 | 2500 | 5 | 135 | 550 | 2 | 5.0 | 7.0 |
| Comparative Example 5 | 1000 | 1500 | 2500 | 5 | — | — | — | 0.5 | 1.5 |
| Comparative Example 6 | 1400 | 1400 | 2800 | 9 | — | — | — | 0.5 | 0.5 |
| Comparative Example 7 | 550 | 550 | 1100 | 9 | 9 | 70 | 170 | 0.5 | 3.0 |

TABLE 4-continued

| | wind-up property | scratch resistance | running durability | electromagnetic conversion characteristics C/N λ = 0.5 μm |
|---|---|---|---|---|
| Example 6 | ○ | ○ | ○ | +3.5 |
| Example 7 | ⊚ | ○ | ○ | +3.0 |
| Example 8 | ○ | ○ | ○ | +3.0 |
| Example 9 | ○ | ○ | ○ | +6.0 |
| Example 10 | ⊚ | ⊚ | ○ | +2.0 |
| Comparative Example 4 | ⊚ | ⊚ | ○ | −3.5 |
| Comparative Example 5 | × | × | × | +4.0 |
| Comparative Example 6 | ×× | × | × | +6.0 |
| Comparative Example 7 | ×× | ×× | × | −2.5 |

As is evident from Tables 2 and 4, the laminate film of the present invention has, even though its thickness is extremely small, a high Young's modulus and the projections of a small height and a large width to an extent that they do not exert an adverse effect on electromagnetic conversion characteristics and hence, a magnetic tape obtained therefrom exhibits excellent electromagnetic conversion characteristics and has excellent running property and scratch resistance and extremely excellent wind-up property as a base film. On the other hand, the magnetic tape of the prior art does not satisfy these four requirements at the same time.

According to the present invention, there can be provided a wholly aromatic polyamide laminate film which is excellent in wind-up property, slipperiness and handling property and is particularly useful as a base film for a high-density magnetic recording medium having excellent electromagnetic conversion characteristics, drop-out and running durability of a magnetic layer even though the thickness of its base film is very small.

What is claimed is:

1. A biaxially oriented laminate film comprising a wholly aromatic polyamide layer A and a wholly aromatic polyamide layer B laminated on one surface of the wholly aromatic polyamide layer A, wherein the surface not in contact with the wholly aromatic polyamide layer B of the wholly aromatic polyamide layer A has projections having an average height of 2 to 85 nm and an average width of 20 to 500 μm at a density of 4 to 2,500/mm²; the wholly aromatic polyamide layer B contains inert fine particles B; the surface, not in contact with the wholly aromatic polyamide layer A, of the wholly aromatic polyamide layer B is rougher than the surface, not in contact with the wholly aromatic polyamide layer B, of the wholly aromatic polyamide layer A;

the wholly aromatic polyamide is a polymer containing at least 70 mol % of a recurring unit represented by the following formula (A):

—(HN—Ar$_1$—NHCO—Ar$_2$—CO)—  (A)

wherein Ar$_1$ is a residual aromatic group obtained by removing two —NH$_2$ groups from an aromatic diamine and Ar is a residual aromatic group obtained by removing two —COOH groups from an aromatic dicarboxylic acid: and the biaxially oriented laminate film has a total Young's modulus of at least 2,000 kg/mm² in two directions, on the film plane, crossing each other at right angles.

2. The biaxially oriented laminate film of claim 1, wherein the wholly aromatic polyamide layer A contains inert fine particles A having an average particle diameter of 5 to 500 nm and a volume shape factor of 0.1 to π/6.

3. The biaxially oriented laminate film of claim 1 or 2, wherein the surface of the wholly aromatic polyamide layer A has projections derived from the inert fine particles A at a density of 1,000 to 10,000,000/mm².

4. The biaxially oriented laminate film of claim 1, wherein the wholly aromatic polyamide layer A does not substantially contain externally added inert fine particles having an average particle diameter of more than 5 nm.

5. The biaxially oriented laminate film of claim 1, wherein the inert fine particles B contained in the wholly aromatic polyamide layer B are (i) first particles having a particle size distribution with a relative standard deviation of 0.5 or less or (ii) second particles which are a combination of the first particles, having the largest average particle diameter, and other particles; and the thickness of the wholly aromatic polyamide layer A and the average particle diameter of the inert fine particles B satisfy a relationship represented by the following expression (1):

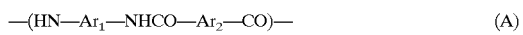

$$4 \leq t_A/d_B \leq 40 \qquad (1)$$

wherein $t_A$ is a thickness (μm) of the wholly aromatic polyamide layer A and $d_B$ is an average particle diameter (μm) of the first particles when the inert fine particles are the first particles only or an average particle diameter (μm) of the first particles forming the second particles when the inert fine particles are the second particles.

6. The biaxially oriented laminate film of claim 5, wherein the average particle diameter of the first particles or the average particle diameter of the first particles forming the second particles is 0.2 to 1 μm.

7. The biaxially oriented laminate film of claim 5 or 6, wherein the content of the first or second particles is 0.001 to 5.0 wt %.

8. The biaxially oriented laminate film of claim 1, wherein the surface, not in contact with the wholly aromatic polyamide layer B, of the wholly aromatic polyamide layer A has a center plane average roughness $^A$WRa of 10 nm or less.

9. The biaxially oriented laminate film of claim 1, wherein the surface, not in contact with the wholly aromatic polyamide layer A, of the wholly aromatic polyamide layer B has a center plane average roughness $^B$WRa of 2 nm or more and less than 15 nm.

10. The biaxially oriented laminate film of claim 1, wherein the thickness of the wholly aromatic polyamide layer A is at least 0.3 μm and the thickness of the wholly aromatic polyamide layer B is at least a half of the average particle diameter $d_B$ of the inert fine particles B contained in the wholly aromatic polyamide layer B.

11. The biaxially oriented laminate film of claim 1 which has a thickness of 1 to 20 μm.

12. The biaxially oriented laminate film of claim 1, wherein wholly aromatic polyamides forming the wholly aromatic polyamide layer A and the wholly aromatic polyamide layer B are substantially identical.

13. The biaxially oriented laminate film of claim 1, wherein the wholly aromatic polyamide comprises at least two aromatic diamines.

14. The biaxially oriented laminate film of claim 1, wherein the wholly aromatic polyamide comprises terephthalic acid as an aromatic dicarboxylic acid component and p-phenylenediamine and 3,4'-diaminodiphenyl ether as aromatic diamine components.

15. The biaxially oriented laminate film of claim 1, wherein the wholly aromatic polyamide is obtained by solution polymerization.

16. A magnetic recording medium comprising the biaxially oriented laminate film of claim 1 and a magnetic recording layer laminated on the surface, not in contact with the wholly aromatic polyamide layer B, of the wholly aromatic polyamide layer A.

17. The magnetic recording medium of claim 16, wherein the magnetic recording layer is a thin metal film layer.

18. The magnetic recording medium of claim 16, wherein the magnetic recording layer is a coated magnetic recording layer having a thickness of 1 μm at most.

19. The magnetic recording medium of claim 16 which is of a digital signal recording type.

20. Use of the biaxially oriented laminate film of claim 1 as a base film for the preparation of a magnetic recording medium.

\* \* \* \* \*